United States Patent [19]

Nozawa et al.

[11] Patent Number: 4,591,771
[45] Date of Patent: May 27, 1986

[54] NUMERICAL CONTROL SYSTEM

[75] Inventors: Ryoichiro Nozawa, Tokyo; Tsuyoshi Nagamine; Hideaki Kawamura, both of Hachioji; Kentaro Fujibayashi, Musashino, all of Japan

[73] Assignee: Fanuc Ltd., Minamitsuru, Japan

[21] Appl. No.: 395,030

[22] PCT Filed: Oct. 23, 1982

[86] PCT No.: PCT/JP81/00295
§ 371 Date: Jun. 18, 1982
§ 102(e) Date: Jun. 18, 1982

[87] PCT Pub. No.: WO82/01602
PCT Pub. Date: May 13, 1982

[30] Foreign Application Priority Data

Oct. 23, 1980 [JP] Japan ................. 55-148758

[51] Int. Cl.$^4$ ............................ G05B 19/19
[52] U.S. Cl. ................... 318/569; 364/170; 318/632; 318/572; 318/591
[58] Field of Search ........... 318/569, 573, 574, 567, 318/568, 600, 570, 625, 572, 632; 364/474, 475, 176, 170, 180, 181, 191–193, 171

[56] References Cited

U.S. PATENT DOCUMENTS

| 3,551,656 | 12/1970 | Wohlfeil | 318/632 X |
| 3,611,102 | 10/1971 | Leenhouts | 318/696 |
| 3,633,011 | 1/1972 | Bederman | 318/574 X |
| 3,818,290 | 6/1974 | Harper | 318/39 |
| 3,866,027 | 2/1975 | Cutler | 364/474 X |
| 3,967,176 | 6/1976 | Wagener | 318/603 |
| 4,250,551 | 2/1981 | Paveglio | 318/569 X |
| 4,296,364 | 10/1981 | Fukuyama | 318/603 X |
| 4,330,831 | 5/1982 | Schwefel | 364/474 |

FOREIGN PATENT DOCUMENTS

| 2349004 | 4/1975 | Fed. Rep. of Germany . |
| 4927787 | 7/1972 | Japan . |
| 4932076 | 7/1972 | Japan . |

OTHER PUBLICATIONS

International Search Report, Nov. 10, 1981.
Supplementary European Search Report, The Hague Date: 4/24/84 Examiner: Cornillie.

Primary Examiner—William M. Shoop, Jr.
Assistant Examiner—Patrick C. Keane
Attorney, Agent, or Firm—Staas & Halsey

[57] ABSTRACT

In order to permit manual operation under a condition where the axial direction of a tool and the direction of a hole to be machined in a workpiece are held in agreement, the tool of a radius $\gamma$ is rotated by $\theta$ in the vertical rotational direction and by $p$ in the horizontal rotational direction in a orthogonal coordinate system and in a spherical coordinate system the origins of which coincide with the center of rotation of the tool. Upon doing so, in the orthogonal coordinates, the position of the front end of the tool becomes $X_0 = \gamma \sin\theta \cdot \cos p$, $Y_0 = \gamma \sin\theta \cdot \sin p$ and $Z_0 = \gamma \cos\theta$. Therefore, a train of pulses (Hp) from a manual pulse generator are distributed as X-, Y- and Z-axial components in the proportion to the above values by a manual pulse distribution circuit, and motors for the respective axes are driven through servo circuits by the pulses.

5 Claims, 6 Drawing Figures

NUMERICAL CONTROL SYSTEM

BACKGROUND OF THE INVENTION

The present invention relates to a numerical control system, and more particularly to a numerical control system in which a tool or a table can be manually moved as the tool axis direction of the tool relative to a workpiece is kept unchanged.

In a machine tool, for example, a machining center, a tool or a table is rotated in the directions of a B-axis (vertical rotational direction) and a C-axis (horizontal rotational direction) so as to control the axial direction of the tool relative to a workpiece (the axial direction being termed the "tool axis direction"), movement also occurs in the directions of the three X, Y and Z axes so as to subject the workpiece to a desired machining operation.

In forming a hole in the workpiece under such simultaneous 5-axis control, first of all, a tool holder is positioned by moving it in the X-, Y- and Z-axial directions unitarily with the tool, while the tool axis direction and the axial direction of the hole to be machined are brought into agreement by rotating the tool in the B-axial directions. Thereafter, while maintaining the tool axis direction, the tool holder is moved toward the workpiece by simultaneous 3-axis control of the X-, Y- and Z-axes. The machining of the hole is started, and the drilling operation is performed down to a predetermined depth. Lastly, the tool is drawn out in the direction opposite the machining to complete the drilling operation. This system has hitherto been proposed.

In the machine tool such as a machining center which conducts machining with the tool inclined relative to the tool holder, an operator may want ① to manually increase or decrease the depth of the cut in the course of the machining with the inclined tool, or ② to manually drill an inclined surface. Here, the expression "manual operation" signifies the function of moving the tool or the table by manually operating an ordinary manual pulse generator or jog button.

In the aforementioned cases ① and ②, the tool must be manually moved by the simultaneous 3-axis control of the X-, Y- and Z-axes as the tool axis direction of the tool is held in agreement with the direction of the hole.

In the manual operation of the prior art, however, the tool 12 (see FIG. 1), is moved in every axial direction by means of the manual pulse generator or the jog button, and the requirement in the cases ① and ② cannot be met.

SUMMARY OF THE INVENTION

An object of the present invention is to provide a novel numerical control system in which a tool can be moved by a manual operation as the tool axis direction and the direction of a hole to be machined in a workpiece are held in agreement, in other words, the tool axis direction relative to a table (or the workpiece) is maintained.

To accomplish the above and other objects, when a tool or a table is rotated in at least one of the vertical and horizontal directions so as to control the axial direction of the tool relative to a workpiece and when the tool is also moved in the directions of the X-, Y- and Z-axes so as to subject the workpiece to desired machining, the tool axis direction relative to the workpiece is calculated on the basis of the amount of rotation of the tool or the workpiece, and the control of manually moving the tool or the table in the calculated direction under the simultaneous control of at least two of the X-, Y- and Z-axes is achieved by numerical control.

DESCRIPTION OF THE PREFERRED EMBODIMENTS

The present invention will now be described with reference to the drawings in order to explain it in greater detail.

Figure 1:
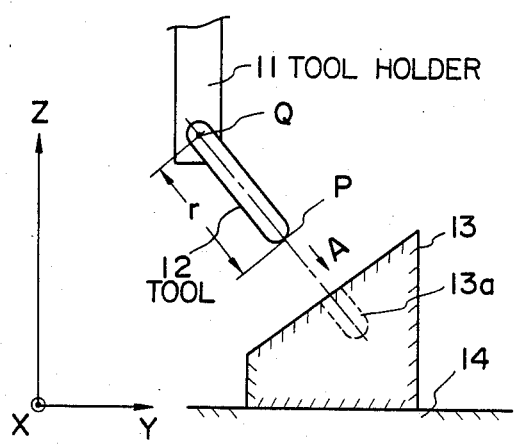
FIGS. 1 and 2 illustrate 5-axis control when a table and workpiece are fixed and when a tool is moved or rotated in the directions of the X-, Y- and Z-axes and the B- and C-axes.
Figure 2:
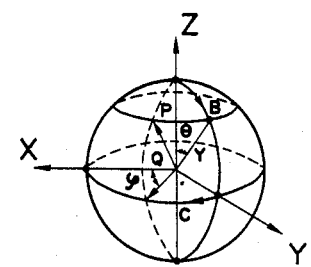

FIGS. 1 and 2 illustrate 5-axis control when a table and workpiece are fixed and when a tool is moved or rotated in the directions of the X, Y, and Z (orthogonal coordinate system) axes and also in the directions of the two B and C (spherical coordinate system) axes. It is also possible to rotate the table or the workpiece in the B- and C-axial directions or to rotate the workpiece in one axial direction and the tool in another axial direction. In the ensuing description, however, it is assumed that only the tool is rotated in the B- and C-axial directions.

In FIG. 1, numeral 11 designates a tool holder which supports a tool and which is driven in the three axial directions, X-, Y- and Z-axes by servomotors not shown. Numeral 12 designates the tool. The front end P, of the tool is rotated in the two axial directions, along the B- and C-axes with a fulcrum at the center of rotation Q. The B-axial directions are the vertical rotational direction and horizontal rotational direction, respectively (FIG. 2). In the spherical coordinate system movement is described by rotating the tool an angle $\theta$ along the B-axis, rotating the tool an angle $p$ along the C-axis and moving the tool a length $\gamma$. Numeral 13 indicates a workpiece, and numeral 14 designates a table on which the workpiece 13 is placed.

By way of example, in forming a hole 13a in the workpiece 13 under 5-axis control, first of all, the tool holder 11 is positioned by moving it in the X-, Y- and Z-axial directions unitarily with the tool 12, while the tool axis direction (the direction A in FIG. 1) of the tool 12 and the direction of the hole 13a, to be machined are brought into agreement by rotating the tool 12 in the B-axial and C-axial directions (FIG. 1). Thereafter, while maintaining the tool axis direction, the tool holder 11 is moved toward the workpiece 13 by the simultaneous 3-axis control of the X-, Y- and Z-axes, whereupon the machining of the hole 13a is started and the drilling operation is performed down to a predetermined depth. Lastly, the tool is drawn out in the direction opposite the machining to complete the drilling operation.

Figure 3:
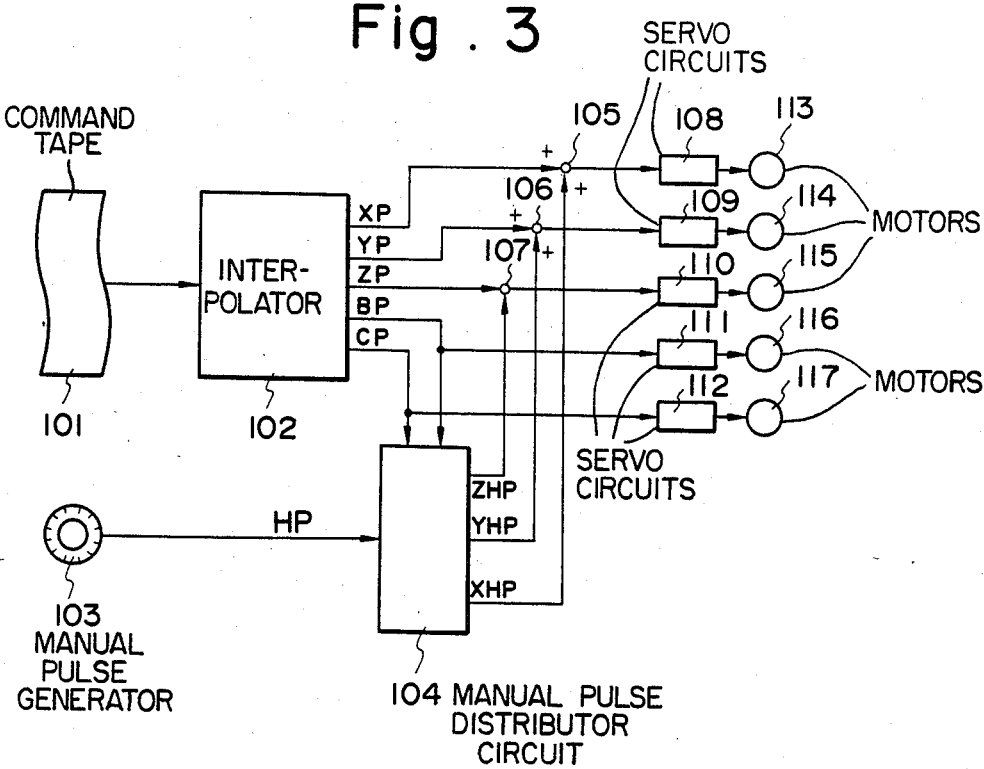
FIGS. 3 and 4 are circuit block diagrams of embodiments for realizing the present invention.

FIG. 3 is a circuit block diagram of an embodiment of the present invention. In FIG. 3, numeral 101 indicates a command tape, numeral 102 designates a well-known interpolator which executes a pulse distribution computation on the basis of a movement command entered from the command type 101, and numeral 103 designates a manual pulse generator that, in accordance with the rotation of its handle over a predetermined angle generates a train of pulses HP that has a frequency proportional to the rotational speed of the handle and that has a number of pulses corresponding to the rotational angle. Numeral 104 indicates a manual pulse distribution circuit which generates manual pulses XHP, YHP and ZHP for the respective X-, Y- and Z-axial directions on the basis of the tool axis direction relative to the workpiece 13 and 14 (FIG. 1) and the number of pulses N of the pulse train HP from the manual pulse generator 103.

The following refers to an orthogonal coordinate system and a spherical coordinate system, the origins of which coincide with the center of rotation Q of the tool 12 as shown in FIG. 2. FIG. 2 schematically illustrates tool movement such that the tool 12 of radius $\gamma$ has been rotated by $\theta$ in the B-axial direction (the vertical rotational direction) and by $\rho$ in the C-axial direction (the horizontal rotation direction). At this time, the orthogonal coordinates of the position P of the front end of the tool are expressed by the following equations:

$$X_O = \gamma \sin\theta \cdot \cos\rho \quad (1)$$

$$Y_O = \gamma \sin\theta \cdot \sin\rho \quad (2)$$

$$Z_O = \gamma \cos\theta \quad (3)$$

These equations are the equations for transformation from the spherical coordinate system into the orthogonal coordinate system.

Let $\Delta X_P$, $\Delta Y_P$ and $\Delta Z_P$ denote the number of pulses which are distributed along the X-, Y- and Z-axes by the manual operation when the machine is positioned as illustrated in FIG. 2. If $$X_O \cdot Y_O \cdot Z_O = \Delta X_P \cdot \Delta Y_P \cdot \Delta Z_P \quad (4)$$

is statisfied, then the tool 12 can be moved while $\theta$ and $\rho$ are held constant. Accordingly, the manual pulse distribution circuit 104 determines $\Delta X_P$, $\Delta Y_P$ and $\Delta Z_P$ so as to satisfy Equation (4). That is, the circuit 104 performs the computations:

$$\Delta X_P = N \cdot \sin\theta \cos\rho \quad (1)'$$

$$\Delta Y_P = N \cdot \sin\theta \sin\rho \quad (2)'$$

$$\Delta Z_P = N \cdot \cos\theta \quad (3)'$$

and generates the manual pulses XHP, YHP, and ZHP in the X-, Y- and Z-axial directions. Numerals 105-107 indicate adders or mixers, which superimpose the manual pulses XHP, YHP and ZHP generated by the manual pulse distribution circuit 104 on distributed pulses $X_P$, $Y_P$ and $Z_P$ generated by the interpolator 102, respectively. Numerals 108-112 indicate servo circuits for the respective axes, and numerals 113-117, designate driving motors for the respective axes.

Now, the operation of the present invention will be described.

Ordinarily, the interpolator 102 executes pulse distribution computations on the basis of the movement command from the command tape 101, and generates the respective distribution pulses $X_P$, $Y_P$, $Z_P$, $B_P$ and $C_P$ for the X-, Y-, Z-, B- and C-axes and applies these pulses to the corresponding servo circuits 108-112. When supplied with the distributed pulses, the respective servo circuits drive the motors 113-117 of the corresponding axes using well-known servo control so as to machine the workpiece as programmed. The B-axial and C-axial distributed driving pulses $B_P$ and $C_P$ generated during such NC control are applied to the respective servo circuits 111 and 112 and are also applied to the reversible counters (corresponding to current position registers), not shown, of the manual pulse distribution circuit 104. One distributed pulse $B_P$ or $C_P$, corresponds to a predetermined rotational angle of the tool 12 in the B-axial direction (the vertical rotational direction) or in the C-axial direction (the horizontal rotational direction), respectively. Therefore, when the distributed pulses $B_P$ and $C_P$ are counted by the reversible counters in accordance with the rotational direction of the tool, the current rotational angle positions $\theta$ and $\rho$ of the tool 12, in the B- and C-axial directions, are stored in the reversible counters.

Described next is the control operation for manually machining the hole 13a after the tool holder 11 and the tool 12 have been placed as illustrated in FIG. 1. In this case, an operator first turns the handle of the manual pulse generator 103 so as to generate a predetermined number of pulses $H_P$. Upon the generation of the pulses $H_P$, respective distribution circuits (not shown), contained in the manual pulse distribution circuit 104 perform their computations. Each of the distribution circuits can be constructed of a known DDA (Digital Differential Analyzer) as will be stated later. The quantities $\Delta X_P$, $\Delta Y_P$ and $\Delta Z_P$ per equations (1)', (2)' and (3)' respectively are calculated and manual pulses XHP, YHP and ZHP are respectively generated in the X-, Y- and Z-axial directions in accordance with the distribution computations. The manual pulses are applied to the servo circuits 108-110 through the adders 105-107 so as to drive the motors 113-115. As a result, as described before, the tool 12 moves toward the workpiece 13 while keeping its tool axis direction in agreement with the direction of the hole 13a to be machined, whereupon the drilling operation is performed. In drawing out the tool 12, the handle of the manual pulse generator 103 may be turned in the direction opposite that initiating the machining.

Also in case of manually increasing or decreasing the quantity of cutting during the drilling operation, the handle of the manual pulse generator 103 may be similarly turned in the clockwise or counterclockwise direction in accordance with the desired amount of cutting.

Figure 4:
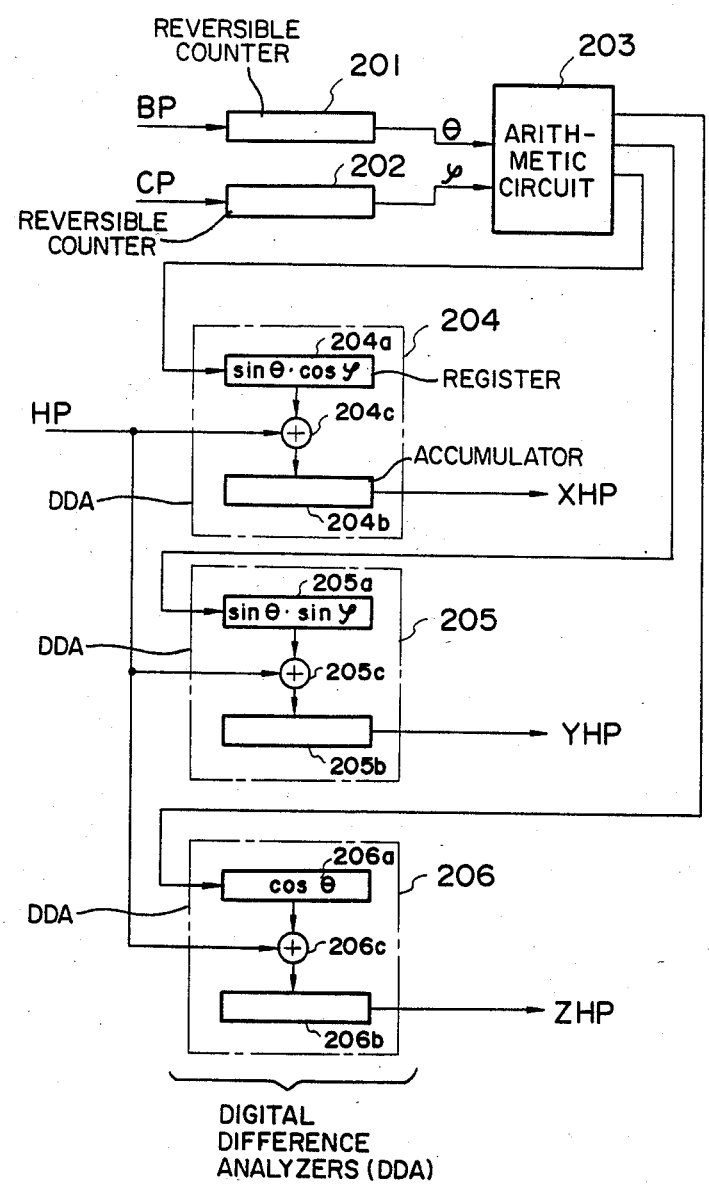

FIG. 4 shows an embodiment of the manual pulse distribution circuit 104 shown in FIG. 3. In FIG. 4, numerals 201 and 202 designate the reversible counters which count the distributed pulses $B_P$ and $C_P$ in the B-axial and C-axial directions in accordance with the respective signs of the pulses, and which store the rotational angle positions $\theta$ and $\rho$ in the B-axial and C-axial directions, respectively. Numeral 203 designates an arithmetic circuit which executes the following computations on the basis of the rotational angle positions $\theta$ and $\rho$:

$$\sin\theta \cdot \cos\rho; \sin\theta \cdot \sin\rho; \cos\theta \quad (5)$$

Numerals 204, 205 and 206 indicate the DDAs, which include registers 204a, 205a and 206a; accumulators 204b, 205b and 206b, and adders 204c, 205c and 206c that add the contents of the registers to those of the accumulators and store the results into the accumulators each time a pulse Hp is generated by the manual pulse generator 103. The registers 204a, 205a and 206a respectively, store the results $\sin \theta \cdot \cos \rho$, $\sin \theta \cdot \sin \rho$ and $\cos \theta$ computed by the arithmetic circuit 203. Now, when each of the accumulators 204b, 205b and 206b is constructed of n bits, its capacity is $(2^n - 1)$. Accordingly, when the operations of performing the additions between the respective registers and the corresponding accumulators and storing the added results in the accumulators are repeated each time Hp is generated, overflow pulses are generated. These overflow pulses correspond to the manual pulses XHP, YHP and ZHP $$N \cdot \sin \theta \cdot \cos \rho / (2^n - 1) \quad (1)''$$

$$N \cdot \sin \theta \cdot \sin \rho / (2^n - 1) \quad (2)''$$

$$N \cdot \cos \theta / (2^n - 1) \quad (3)''$$

The number of manual pulses generated by the respective accumulators 204b, 205b and 206b is proportional to the generation of the N-number of pulses Hp. Accordingly, if the computed results (5) are multiplied by $(2^n - 1)$ in the arithmetic circuit 203, before being stored in the respective registers, the manual pulses numbering:

$$N \cdot \sin \theta \cdot \cos \rho, N \cdot \sin \theta \cdot \sin \rho \text{ and } N \cdot \cos \theta$$

are generated.

Figure 5:
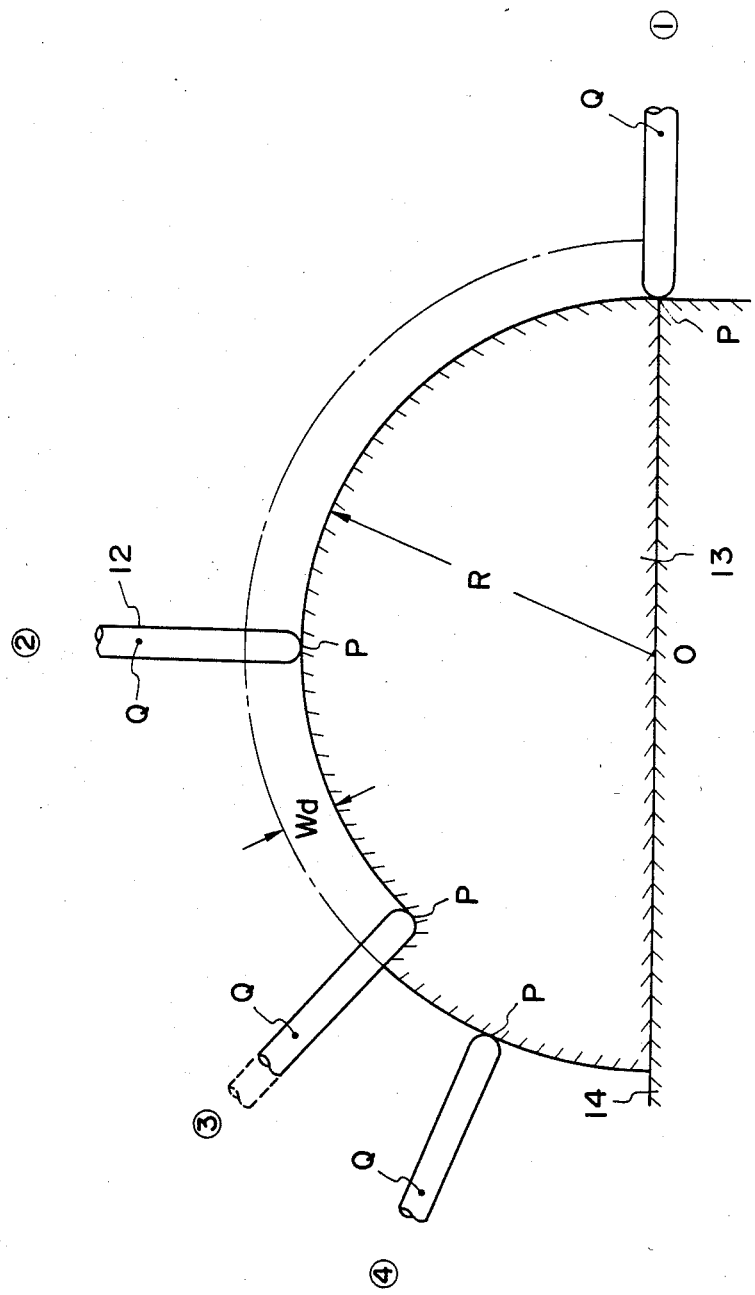
FIG. 5 illustrates a situation where the depth of the cut is manually decreased at a predetermined point in the course of simultaneous 5-axis control.

FIG. 5 illustrates a situation where the depth of cut is manually decreased from the predetermined point during the simultaneous 5-axis control.

In FIG. 5, numeral 12 denotes a tool, numeral 13 denotes a workpiece, numeral 14 denotes a table, letter P denotes the front end of the tool, and letter Q denotes the center of rotation of the tool.

Command data received from the command tape determines that the workpiece 13 is to be cut to a radius R, and that the tool axis may normally face the center 0 of a circular arc.

Therefore, the tool 12 traces the solid line positions of ①→②→③ in FIG. 5 and performs the commanded cutting of the workpiece. Then, if it is desired to decrease the cutting amount, Wd, at the position ③, the operator causes manual pulses to be generated by operating the manual pulse generator or jog button, and the tool retracts in the tool axis direction. Thenceforth, the workpiece is cut to a radius of (R+Wd).

Figure 6:
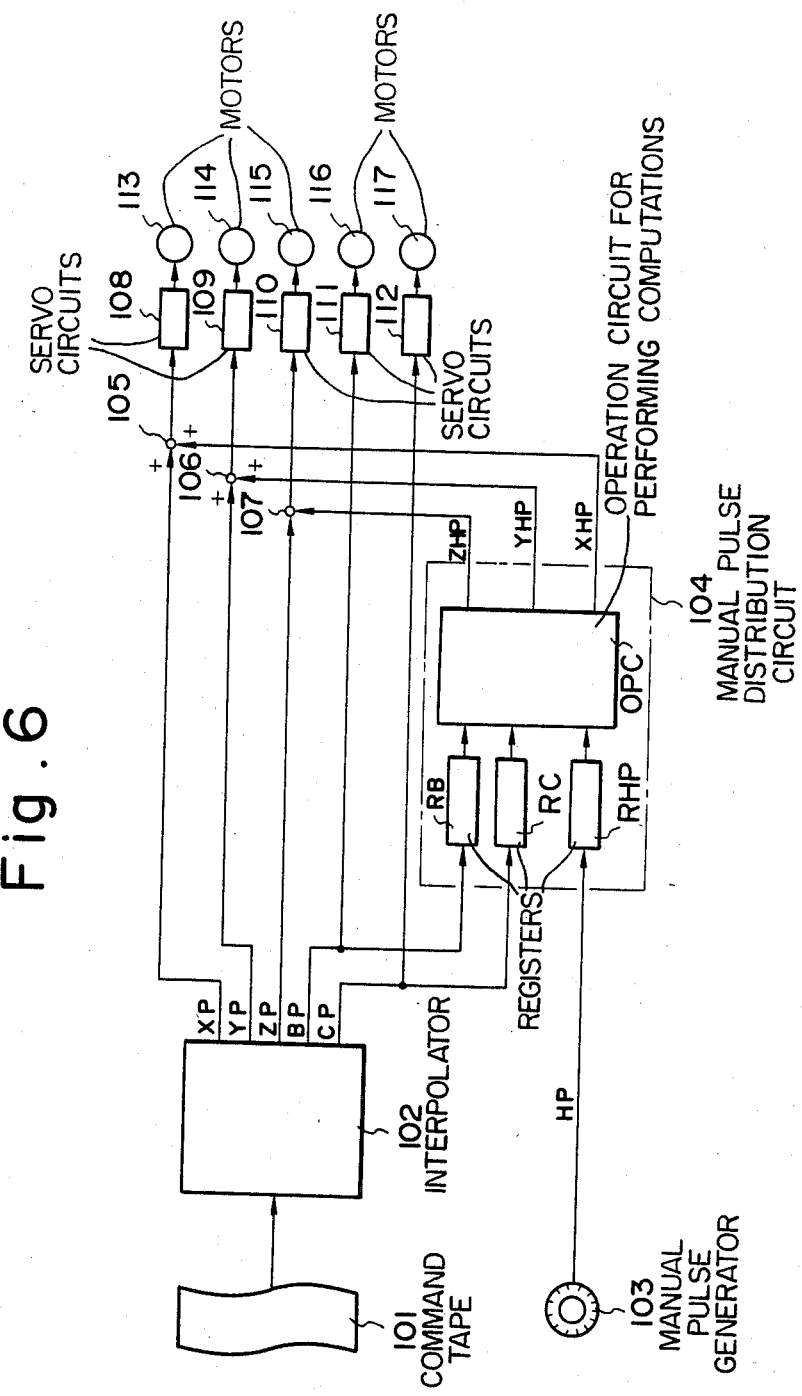
FIG. 6 is a circuit block diagram of the present invention for maintaining the tool axis orientation during manual pulse generation in the course of simultaneous 5-axis control.

FIG. 6 is a circuit block diagram for the tool axis direction when manual pulses are generated during the simultaneous 5-axis control. The same parts as in FIG. 3 are assigned the same symbols, and the detailed description thereof will be omitted. FIG. 6 differs from FIG. 3 in that the main parts of the manual pulse distribution circuit 104 as illustrated.

The manual pulse distribution circuit 104, includes registers RB and RC count the distributed pulses Bp and Cp in the B-axial and C-axial directions in accordance with the direction of movement, and which store the integrated values of the distributed pulses on the B-axis and C-axis at a time $t_n$, in other words, current rotational angle positions $\theta(t_n)$ and $\rho(t_n)$, respectively. A register RHP counts the manual pulses Hp generated by the manual pulse generator 103 in accordance with the direction that the handle of the manual pulse generator is turned. The register RHP also stores the integrated value $Hp(t_n)$ of the manual pulses Hp at the time $t_n$. An operation circuit OPC executes predetermined computations (explained below), at fixed time intervals when the manual pulses Hp are generated. The operation circuit also generates the manual compensation pulses XHP, YHP and ZHP in the X-, Y- and Z-axial directions. The operation circuit OPC contains registers which store the integrated values $HPX(t_{n-1})$, $HPY(t_{n-1})$ and $HPZ(t_{n-1})$ for the respective manual compensations pulses XHP, YHP and ZHP in the respective axial directions. The integrated values correspond to the time $t_{n-1}$ which preceeds the time $t_n$ by a certain time interval.

The operation circuit OPC performs, at fixed time periods, the computations for the following equations, and generates the compensation pulses XHP, YHP and ZHP. In equations (6)–(8), $HPX(t_n)$, $HPY(t_n)$ and $HPZ(t_n)$ denote the integrated values of the compensation pulses XHP, YHP and ZHP at the time $t_n$, respectively.

$$HPX(t_n) = HP(t_n) \cdot \sin \theta(t_n) \cdot \cos \rho(t_n) \quad (6)$$

$$HPY(t_n) = HP(t_n) \cdot \sin \theta(t_n) \cdot \sin \rho(t_n) \quad (7)$$

$$HPZ(t_n) = HP(t_n) \cdot \cos \theta(t_n) \quad (8)$$

On the other hand, before Equations (6)–(8) are computed, the integrated values $HPX(t_{n-1})$, $HPY(t_{n-1})$ and $XPZ(t_{n-1})$ of the respective compensation pulses XHP, YHP and ZHP at the time $t_{n-1}$ are stored in the registers contained in the operation circuit OPC. Therefore, the number of compensation pulses $\Delta HPX(t_n)$, $\Delta HPY(t_n)$ and $\Delta HPZ(t_n)$ for the respective axes at the time $t_n$ are obtained in accordance with the following equations:

$$\Delta HPX(t_n) = HPX(t_n) - HPX(t_{n-1}) \quad (9)$$

$$\Delta HPY(t_n) = HPY(t_n) - HPY(t_{n-1}) \quad (10)$$

$$\Delta HPZ(t_n) = HPZ(t_n) - HPZ(t_{n-1}) \quad (11)$$

Accordingly, when the compensation pulses ZHP, YHP and ZHP are obtained in accordance with equations (9)–(11) and are respectively applied to the servo circuits 108–110 through the adders 105–107, the tool advances or retreats in the tool axis direction.

In the above, the present invention has been described in detail in conjunction with the preferred embodiments but, is not restricted to these embodiments. By way of example, the table may be rotated as well, and the table and the tool also may be respectively rotated. Further, while the discussion has been directed the tool being rotated in the axial directions of the B- and C-axes, the rotation is not restricted to that relative to the two axes but, may well be relative to only one axis, and the turning is not restricted to that relative the B- and C-axes but may well be relative to another axis.

According to the present invention, the simultaneous 3-axis movement control of the tool can be achieved by a manual operation. Moreover, the tool can be moved in its axis direction by manual operation while the tool axis direction and the direction of a hole to be machined in a workpiece are held in agreement; in other words, as the inclination of the tool relative to the workpiece is held constant. As a result, the depth of a cut can be manually controlled, even during the course of machining with the tool inclined with respect to the workpiece. Further, the inclined surface of the workpiece can be manually drilled so that a numerical control device having good operability and being capable of wide control can be provided.

What is claimed is:

1. A numerical control system having a tool with a tool axis and a table movable with respect to each other wherein the tool or the table is rotated in at least one of a vertical and horizontal direction so as to align the tool axis direction relative to a workpiece mounted on the table, and is moved in the orthogonal directions of X-, Y-, and Z-axes so as to subject the workpiece to desired machining, said numerical control system including:

means for receiving a commanded amount of movement of said tool or of said table and for providing a command signal varying in accordance with said commanded amount of movement;

manual command generating means for generating a manual command signal in response to a manual input;

distribution means for receiving said command signal and said manual command signal for moving said tool or said table and for maintaining the tool axis direction of said tool relative to said workpiece on the basis of the position of said tool or of said table, as said tool or said table is manually moved in accordance with said manual command signal with respect to said workpiece under simultaneous control of at least two of the X-, Y- and Z-axes.

2. A numerical control system as defined in claim 1, wherein $\theta$ and $\rho$ denote the positions of said tool in the vertical and horizontal directions respectively, and said system further including a manual pulse generator means, operatively connected to said distribution means, for generating N pulses, wherein said distribution means includes means for generating control pulses for each of said orthogonal axes such that the numbers of pulses $\Delta X_P$, $\Delta Y_P$ and $\Delta Z_P$ for the respective axes are obtained in accordance with $$\Delta X_p = N \cdot \sin \theta \cdot \cos \rho$$

$$\Delta Y_p = N \cdot \sin \theta \cdot \sin$$

$$\Delta Z_p = N \cdot \cos \theta.$$

3. A machine tool having a tool with a tool axis, the tool capable of being moved with respect to 5 axes corresponding to an X, Y, Z orthogonal coordinate system and a $\theta, \rho$ spherical coordinate system oriented with respect to said orthogonal system, said machine tool also having a table and a workpiece with a workpiece axis aligned with said tool axis, said machine tool comprising:

receiving means for receiving command machine tool movement;

conversion means for converting said command machine tool movement into distributed command pulses corresponding to movement with respect to said 5 axes;

manual command pulse generating means for generating manual command pulses corresponding to movement of said tool along said tool axis;

manual distribution means for converting said manual command pulses into distributed manual command pulses corresponding to movement in at least two of said orthogonal axes, so that said tool axis and said workpiece axis remain aligned;

adder means for combining said distributed command pulses and said distributed manual command pulses, and for providing a servo control signal varying in accordance with said combined signals;

a motor; and servo means for converting said servo control signal into a motor control signal, and for controlling said motor in accordance with said servo control signal.

4. A numerical control system according to claim 3, wherein said tool has a length L and point on said tool has a position defined by $X_0 = L \sin \theta \cdot \cos \rho$; $Y_0 = L \sin \theta \cdot \sin \rho$; $Z_0 = L \cos \theta$, and wherein said manual distribution means comprises:

spherical position counting means for counting said distributed command pulses corresponding to movement in said $\theta$ and $\rho$ axial directions, respectively, and for providing counting outputs responsive to said counting position in said $\theta$ and $\rho$ axial directions;

arithmetic means, operatively connected to said spherical position counting means, for calculating the orthogonal coordinates of the point on said tool in accordance with said counting outputs, and for providing respective coordinate outputs responsive to said calculated orthogonal coordinates;

adder means for adding said coordinates outputs of said arithmetic means and manual command pulses, and for providing said distributed manual command pulses.

5. A numerical machine tool according to claim 4, wherein said adder means comprises;

register means for storing respective outputs of said arithmetic means;

summation means, for summing said manual command pulses and the respective contents of said register means; and modulo N accumulator means for storing the respective summations of the summation means, and for providing overflow outputs corresponding to said distributed manual command pulses.

* * * * *

UNITED STATES PATENT AND TRADEMARK OFFICE
CERTIFICATE OF CORRECTION

PATENT NO. :   4,591,771

DATED      :   May 27, 1986

INVENTOR(S) :  Nozawa et al.

It is certified that error appears in the above-identified patent and that said Letters Patent is hereby corrected as shown below:

Front Page, [22] "PCT Filed Oct. 23, 1982" should be --PCT Filed Oct. 23, 1981--.

Signed and Sealed this

Thirtieth Day of September 1986

[SEAL]

Attest:

DONALD J. QUIGG

Attesting Officer

Commissioner of Patents and Trademarks